3,409,435
SILVER HALIDE GELATIN COATING COMPOSITIONS CONTAINING A VISCOSITY REDUCING AGENT
Bernhard Seidel, Cologne-Mulheim, Hans Ulrich, Leverkusen, Wolfgang Himmelmann, Cologne-Stammheim, and Joachim Nentwig, Krefeld-Bockum, Germany, assignors to Agfa Aktiengesellschaft, Leverkusen, Germany, a corporation of Germany
No Drawing. Filed Aug. 5, 1964, Ser. No. 397,054
Claims priority, application Germany, Aug. 17, 1963, A 43,850
4 Claims. (Cl. 96—94)

ABSTRACT OF THE DISCLOSURE

Aqueous gelatin casting solutions have their viscosities reduced and cast better when they contain a water-soluble mixed glycol polymer as defined below. This offsets the viscosity increase that results when color couplers or dyes are present in the casting solutions for photographic purposes.

---

This invention relates to an improved aqueous gelatin coating composition more particularly photographic coating compositions, which contain soluble, diffusion-resistant dyes such as filter dyes or color couplers capable of forming a dye upon reaction with the oxidation products of color-forming developers, and to gelatin layers produced by casting said coating compositions onto a sheet-like support.

Water-soluble dyes and color couplers that can be incorporated in a diffusion-fast manner in gelatin, for example, in photographic emulsions have the disadvantage of thickening the aqueous gelatin solutions, so that it may become impossible to cast them. In some cases, even solutions containing only a small amount of the dye such as an azo dye, or the photographic color coupler are highly viscous or even of a gel-like consistency at room temperature.

It has already been suggested in the art to utilize in gelatin coating compositions containing dyes or color couplers various additives for reducing the viscosity increasing effect of those dyes and color couplers. Such additives which have been employed are, for example, aliphatic, unsaturated acid amides or their polymers, or water-soluble polyethers or their water soluble substitution products, such as polyethylene glycol, polyglycerides or poly-n-vinylpyrrolidone.

While a number of these additives have utility, it has been noted that they are deficient in certain respects. For example, while certain agents considerably contribute to the ease of the coating, they are not useful because of adverse photographic properties. Others of the additives are of limited utility since they only reduce or neutralize the thickening effect of certain water soluble and diffusion-resistant color couplers but do not sufficiently reduce the viscosity of gelatin coating compositions which contain dyes, more particularly azo dyes.

An object of the invention is to provide new additives which are photographically inert and which sufficiently decrease the viscosity of gelatin coating compositions containing water-soluble and diffusion-resistant dyes or color couplers. Another object is to provide gelatin layers in particular photographic gelatin layers produced by applying those coating compositions onto a support such as a transparent support of a polymeric material or paper. Other objects will appear hereinafter.

We have found that the above object may be accomplished by using as viscosity reducing agent water-soluble poly-1,3-propylene glycol ethers containing at least two and preferably up to 15 1,3-propylene oxide units, the central carbon atoms of which are substituted by an oxalkylated methylol group containing at least one and preferably up to 15 ethylene oxide units. The propylene oxide units of the aforementioned products can furthermore be substituted at the central carbon atom by a lower alkyl or alkoxy group. The products have an extremely powerful viscosity reducing effect on aqueous gelatin compositions containing a water-soluble and diffusion-resistant dye or color-coupler.

Compounds which are embraced by the following general formula exhibit particular utility I 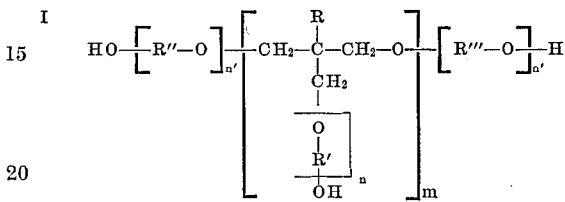

wherein

R represents a member selected from the group consisting of a hydrogen atom, an alkyl group having 1 to 5 carbon atoms, such as methyl, ethyl, propyl, and alkoxymethyl groups having up to 5 carbon atoms, preferably methoxy-methyl or ethoxymethyl group;
—R'—O—, —R''—O—, and —R'''—O— represent ethylene ether units or mixtures of ethylene ether units with such units in which the ethylene is substituted with alkyl having up to 3 carbon atoms or phenyl;
$m$ represents an integer from 2–15, preferably 3–10;
$n$ represents an integer from 1–15; and
$n'$ represents an integer from 0–15, preferably 1–15.

The above compounds are far more effective than polyethyleneglycol. A number of diffusion-resistant and water-soluble dyes more especially azo dyes can only be utilized with the aid of the compounds of the present invention.

The particular quantity of the compounds of the present invention used in a given gelatin coating solution can vary dependent upon the effects desired or the kind of the additive which produce the thickening of the gelatin composition. Thus, a coating composition containing a water-soluble diffusion-resistant color coupler requires a smaller amount of the polyalkyleneglycol of the present invention than a gelatin composition containing a dye, more especially an azo dye. We have found that generally from about 0.1–10 g. preferably from 0.5–5 g. of the polyalkylene glycol per kg. of photographic emulsion or gelatin composition are quite adequate to obtain the desired viscosity.

The compounds of the present invention are preferably utilized in gelatin silver halide emulsions which contain water-soluble diffusion-resistant azo dyes. Such compositions are to be used for the production of photographic elements which are processed by the so-called silver-dye-bleach process, the principle of which is described, for example, in the "History of Color Photography" by J. S. Friedman, published by the American Photographic Publishing Company, Boston, chapter 24.

The compounds of the present invention can further be used as coating aids for gelatin coating compositions which contain filter or antihalo dyes and which are intended for the production of protective filter or antihalo layers.

The coating aids of the present invention can be used for any gelatin coating compositions although the addition to silver halide emulsion compositions are preferred. The emulsions in which the coating aid is to be used can be chemically sensitized by any of the accepted procedures. They can be treated with salts of noble metals, gold salts, reducing agents, polyamines and the like. The emulsions can also be optically sensitized with any of the known sensitizing dyes such as with cyanine or merocyanine dyes.

The emulsions can also be stabilized with any of the known stabilizers such as mercury compounds, heterocyclic compounds containing the mercapto group or azoindenes such as described by Birr. in "Z. Wiss. Phot.," volume 47, 1952, pp. 2 to 28.

The water-soluble polyalkyleneglycol ethers of the present invention can be produced as described in German Patents Nos. 1,023,227 or 1,037,136 or British Patent specification No. 789,415 or U.S. Patent No. 2,917,468. The compounds are prepared by reacting and polymerizing oxacyclo butanes of the following formula (II)
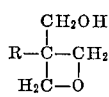

wherein R has the meaning given in connection with Formula I. The compounds of Formula I can be prepared by first etherifying the methylol grouping of the above oxacyclobutane by reacting with an alkylene oxide, preferably ethylene oxide or mixtures of ethylene oxide and higher alkylene oxides, such as 1,2-propylene oxide, 1,2-butylene oxide, or styrene oxide and thereafter polymerizing the resulting compounds preferably with the aid of acid catalysts. Preferably compounds of Formula I are produced by first polymerising the oxacyclobutane and by etherifying the methylol grouping thereafter. It is necessary to employ such an amount of ethylene oxide, that the resulting polyether is water-soluble. Suitable oxacyclobutanes are, for example, the following:

3-ethyl-3-hydroxymethyl-oxacyclobutane,
3-propyl-3-hydroxymethyl-oxacyclobutane,
3-hydroxymethyl-oxacyclobutane,
3-methoxymethyl-3-hydroxymethyl-oxacyclobutane.

The following examples will serve to illustrate the manner of using the new compounds in gelatin coating compositions for the production of photographic gelatin layers.

Example 1

1 liter of an 8% aqueous gelatin solution is mixed with 450 ml. of a 1% aqueous solution of a dye of formula

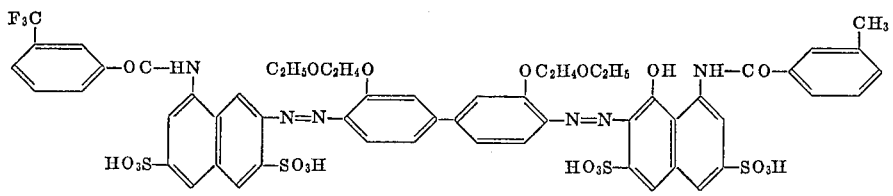

and 200 ml. water. The mixture is adjusted to pH 6.

The viscosity of the composition is determined by means of a so-called outflow viscosimeter, measuring the time of outflow of a given volume while the temperature is kept constant.

The above mixed gelatine composition had an outflow time of 74 sec. at 40° C. On dilution with water, this composition becomes inhomogeneous, and its viscosity rises due to a kind of gel formation (formation of lumps) in certain regions. No even layer can be obtained by casting that composition.

If 20 ml. of the water of the foregoing mixture is replaced by a 10% solution in methanol of a poly-(1,3-propylene glycol ether) obtained from 3-ethyl-3-hydroxymethyl-oxacyclobutane which has a molecular weight of about 580 and which contains about 5 1,3-propyleneglycol units etherified with 3 moles of ethylene oxide per each hydroxyl group, the time of outflow time falls to 53 sec. under otherwise identical conditions. On dilution with water, the modified composition remains completely homogeneous and the viscosity falls uniformly with the dilution. A solution prepared in this way can be cast perfectly satisfactorily on any surface.

Example 2

1 liter of a panchromatically sensitized silver bromide gelatin emulsion is added to 500 ml. of an aqueous solution of 5 g. of the dye of the formula given in Example 1 and 0.6 g. of saponin. The time of outflow measured as described in Example 1 is 240 sec. The addition of 20 ml. of a 10% solution of a poly-(1,3-propylene glycol ether) obtained from 3-ethyl-3-hydroxymethyl oxacyclobutane which has a molecular weight of about 930 and which contains about 8 1,3-propyleneglycol units etherified with 4.2 moles of ethylene oxide per each hydroxyl group, reduces the time of outflow to 175 sec.

Example 3

1 liter of an 8% gelatin solution was treated with 187.5 ml. of an 8% solution of the color coupler having formula

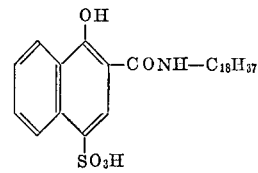

and with 200 ml. of water. It is adjusted to pH 6. The viscosity measurement as described in Example 1 gives a time of outflow of 480 sec.

If 20 ml. of the water used is replaced by a 10% solution of pentadecyl succinic acid polyglyceride, an outflow time of 398 sec. is produced.

The time of outflow is reduced to 273 sec. by replacing 20 ml. of the water used with 20 ml. of a 10% solution of a poly-(1,3-propylene glycol ether) of 3-ethyl-3-hydroxymethyl-oxacyclobutane which has a molecular weight of about 580 and which contains about 5 1,3-propyleneglycol units etherified with 3 moles of ethylene oxide per each hydroxyl group.

Example 4

1 liter of an 8% gelatin solution was treated with 600 ml. of a 2.5% solution of the color coupler having formula

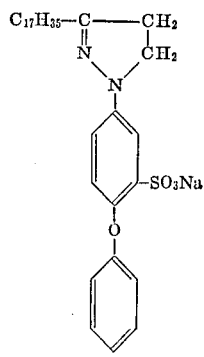

The outflow time determined as in Example 1 is 147 sec. If 20 ml. of the water is replaced by the same volume of a 10% solution of a poly-(1,3-propylene glycol ether) from 3-ethyl-3-hydroxymethyl-oxacyclobutane which has a molecular weight of about 930 and which contains about 8 1,3-propyleneglycol units etherified with 13 moles of ethylene oxide per each hydroxyl group, the outflow time is found to be 134 sec. The addition of the same quantity of the same poly-(1,3-propyleneglycol ether) etherified with 3 moles ethylene oxide per hydroxyl group, gives an outflow time of 104 sec.

We claim:

1. A gelatin silver halide emulsion containing therein as a water-soluble viscosity reducing agent an effective amount of a water-soluble poly-1,3-propylene glycol ether containing at least 2 propylene oxide units, the central carbon atoms of which are substituted by an oxyalkylated methylol group containing at least one ethylene oxide unit.

2. A gelatin silver halide emulsion as defined in claim 1, in which the viscosity reducing agent has the formula:

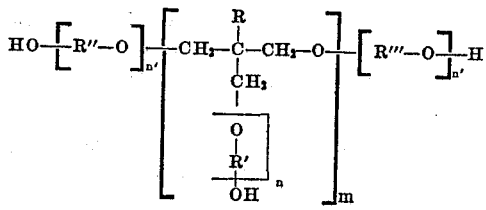

wherein

R represents a member of the group consisting of hydrogen, alkyl of up to 5 carbon atoms and alkoxymethyl having up to 3 carbon atoms, the alkoxy group of which having up to 5 carbon atoms;

—R'—O—, —R''—O—, and —R'''—O— each represent an ethylene ether unit;

$m$ represents an integer from 2–15;

$n$ represents an integer from 1–15; and $n'$ represents an integer from 0–15.

3. A gelatin silver halide emulsion as defined in claim 2 wherein R is an alkyl having up to 5 carbon atoms, $m$ represents an integer from 3 to 10 and $n'$ an integer from 1–15.

4. A gelatin silver halide emulsion as defined in claim 1 in which the emulsion also contains viscosity-increasing material selected from the class consisting of viscosity-increasing color couplers and dyes.

References Cited
UNITED STATES PATENTS

| | | | |
|---|---|---|---|
| 2,677,700 | 5/1954 | Jackson et al. | 260—615 |
| 2,768,894 | 10/1956 | Harriman | 96—94 |
| 2,917,468 | 12/1959 | Schnell et al. | 260—2 |
| 2,933,406 | 4/1960 | Salzberg et al. | 106—125 |

J. TRAVIS BROWN, *Primary Examiner.*